(12) United States Patent
Hachtmann

(10) Patent No.: US 7,175,026 B2
(45) Date of Patent: Feb. 13, 2007

(54) MEMORY DISK SHIPPING CONTAINER WITH IMPROVED CONTAMINANT CONTROL

(75) Inventor: Bruce Hachtmann, San Martin, CA (US)

(73) Assignee: Maxtor Corporation, Longmont, CO (US)

( * ) Notice: Subject to any disclaimer, the term of this patent is extended or adjusted under 35 U.S.C. 154(b) by 265 days.

(21) Appl. No.: 10/406,765

(22) Filed: Apr. 2, 2003

(65) Prior Publication Data

US 2003/0205501 A1    Nov. 6, 2003

Related U.S. Application Data

(60) Provisional application No. 60/403,819, filed on Aug. 14, 2002, provisional application No. 60/377,876, filed on May 3, 2002.

(51) Int. Cl.
*B65D 85/00* (2006.01)
*A45C 13/10* (2006.01)

(52) U.S. Cl. .................. 206/711; 206/1.5; 206/445; 206/454; 206/832

(58) Field of Classification Search ............... 206/445, 206/454, 303, 832, 710, 711, 1.5; 211/41.11, 211/41.12, 41.14, 41.18; 312/9.9, 9.64; 220/322, 220/324, 780, 784
See application file for complete search history.

(56) References Cited

U.S. PATENT DOCUMENTS 3,913,749 A    10/1975   Wyers ..................... 214/1 BD
3,918,756 A    11/1975   Saville et al. ............... 294/31.2
3,923,156 A    12/1975   Wallestad .................... 206/454
3,923,191 A    12/1975   Johnson ..................... 220/94 R
3,926,305 A    12/1975   Wallestad .................... 206/73
3,939,973 A     2/1976   Wallestad .................... 206/328
3,961,877 A     6/1976   Johnson ....................... 432/253
4,043,451 A     8/1977   Johnson ....................... 206/334

(Continued)

FOREIGN PATENT DOCUMENTS

DE              262503 A    11/1988

(Continued)

OTHER PUBLICATIONS

Australian Written Opinion and Search Report, Apr. 14, 2005, Singapore Application No. SG200302272-0.

(Continued)

*Primary Examiner*—Mickey Yu
*Assistant Examiner*—Gregory Pickett
(74) *Attorney, Agent, or Firm*—Sheridan Ross P.C.

(57) ABSTRACT

A container for disks has an improved latching mechanism. The container comprises a cassette with sidewalls with slots for holding disks in an axial arrangement, two opposite end walls each have a U-shaped recess extending downwardly from the open top, a top cover with a rectangular top portion and two end portions extend downwardly to cover the U-shaped recess. The top cover latches to the cassette by way of a latching mechanism which includes a living hinge, an extension portion, and a hook portion all on each end portion. The hook portion cooperates and engages with a cooperative catch member on the cassette. The extension member is under tension to secure the top cover in place. In an alternate embodiment, recesses on the extension portion connect to nubs on the cassettes or on the bottom cover to secure the top cover in place.

41 Claims, 13 Drawing Sheets

U.S. PATENT DOCUMENTS

| | | | |
|---|---|---|---|
| 4,061,228 A | 12/1977 | Johnson | 206/454 |
| 4,248,346 A | 2/1981 | Johnson | 206/334 |
| 4,450,960 A | 5/1984 | Johnson | 206/334 |
| 4,471,716 A | 9/1984 | Milliren | 118/500 |
| 4,493,418 A | 1/1985 | Johnson | 206/454 |
| 4,520,925 A | 6/1985 | Johnson | 206/334 |
| 4,557,382 A | 12/1985 | Johnson | 206/444 |
| 4,582,219 A | 4/1986 | Mortensen et al. | 220/326 |
| 4,669,612 A | 6/1987 | Mortensen | 206/454 |
| 4,684,021 A | 8/1987 | Niebling et al. | 206/334 |
| 4,687,097 A | 8/1987 | Mortensen | 206/334 |
| 4,709,834 A | 12/1987 | Mortensen et al. | 220/326 |
| 4,718,552 A | 1/1988 | Rossi et al. | 206/444 |
| 4,721,207 A * | 1/1988 | Kikuchi | 206/711 |
| 4,724,963 A | 2/1988 | Mortensen | 206/454 |
| 4,747,488 A * | 5/1988 | Kikuchi | 206/711 |
| 4,752,007 A | 6/1988 | Rossi et al. | 206/444 |
| 4,793,488 A | 12/1988 | Gregerson | 206/454 |
| 4,815,601 A | 3/1989 | Peterson et al. | 206/454 |
| 4,817,795 A | 4/1989 | Kos | 206/328 |
| 4,817,799 A | 4/1989 | Gregerson et al. | 206/445 |
| 4,827,110 A | 5/1989 | Rossi et al. | 225/376 |
| 4,833,306 A | 5/1989 | Milbrett | 235/375 |
| 4,838,422 A | 6/1989 | Gregerson | 206/444 |
| 4,872,554 A | 10/1989 | Quernemoen | 206/454 |
| 4,880,116 A | 11/1989 | Kos | 206/454 |
| 4,888,473 A | 12/1989 | Rossi et al. | 235/376 |
| 4,930,634 A | 6/1990 | Williams et al. | 206/454 |
| 4,949,848 A | 8/1990 | Kos | 211/41 |
| 4,966,284 A | 10/1990 | Gregerson et al. | 206/444 |
| 5,025,926 A | 6/1991 | Gregerson et al. | 206/444 |
| 5,038,677 A | 8/1991 | Wittman et al. | 100/137 |
| 5,046,615 A | 9/1991 | Nentl et al. | 206/454 |
| 5,111,936 A | 5/1992 | Kos | 206/334 |
| 5,123,681 A | 6/1992 | Kos et al. | 292/87 |
| 5,154,301 A | 10/1992 | Kos | 211/41 |
| 5,184,723 A | 2/1993 | Karl et al. | 206/454 |
| 5,207,324 A | 5/1993 | Kos | 206/334 |
| 5,230,190 A | 7/1993 | Schuette | 52/220.1 |
| 5,248,033 A | 9/1993 | Kos et al. | 206/334 |
| 5,253,755 A | 10/1993 | Maenke | 206/444 |
| 5,255,783 A | 10/1993 | Goodman et al. | 206/334 |
| 5,270,482 A | 12/1993 | Kos | 118/500 |
| 5,273,159 A | 12/1993 | Gregerson | 206/334 |
| 5,348,151 A | 9/1994 | Dressen | 206/334 |
| 5,375,708 A | 12/1994 | Wittman | 206/315.1 |
| 5,423,422 A | 6/1995 | Boire et al. | 206/334 |
| 5,472,086 A | 12/1995 | Holliday et al. | 206/711 |
| 5,476,176 A | 12/1995 | Gregerson et al. | 206/711 |
| 5,482,161 A | 1/1996 | Williams et al. | 206/711 |
| 5,555,981 A | 9/1996 | Gregerson | 206/711 |
| 5,575,394 A | 11/1996 | Nyseth | 206/710 |
| 5,586,658 A | 12/1996 | Nyseth | 206/711 |
| 5,642,813 A | 7/1997 | Nyseth | 206/597 |
| 5,686,521 A | 11/1997 | Massengale et al. | 524/496 |
| 5,704,494 A * | 1/1998 | Nishikiori et al. | 206/454 |
| 5,709,065 A | 1/1998 | Krause | 206/710 |
| 5,711,427 A | 1/1998 | Nyseth | 206/710 |
| 5,749,467 A | 5/1998 | Gregerson | 206/445 |
| 5,749,469 A | 5/1998 | Williams | 206/710 |
| 5,755,332 A | 5/1998 | Holliday et al. | 206/711 |
| 5,775,508 A | 7/1998 | Bongard et al. | 206/711 |
| 5,780,127 A | 7/1998 | Mikkelsen | 428/35.7 |
| 5,788,082 A | 8/1998 | Nyseth | 206/711 |
| 5,803,269 A | 9/1998 | Jacoby et al. | 206/592 |
| 5,816,410 A | 10/1998 | Nyseth | 206/711 |
| 5,833,067 A * | 11/1998 | Joshi | 206/454 |
| 5,842,575 A | 12/1998 | Dressen et al. | 206/711 |
| 5,915,562 A | 6/1999 | Nyseth et al. | 206/710 |
| 5,921,397 A | 7/1999 | Whalen | 206/711 |
| 5,944,194 A | 8/1999 | Gregerson et al. | 206/711 |
| 5,957,292 A | 9/1999 | Mikkelsen et al. | 206/710 |
| 5,967,571 A | 10/1999 | Gregerson | 292/33 |
| 5,992,638 A | 11/1999 | Gregerson et al. | 206/711 |
| 6,000,550 A | 12/1999 | Simpson et al. | 206/711 |
| 6,010,008 A | 1/2000 | Nyseth et al. | 206/711 |
| 6,010,009 A | 1/2000 | Peterson et al. | 206/711 |
| 6,039,186 A | 3/2000 | Bhatt et al. | 206/711 |
| 6,070,730 A | 6/2000 | Narisawa et al. | 206/711 |
| 6,082,540 A | 7/2000 | Krampotich et al. | 206/445 |
| 6,164,530 A | 12/2000 | Cheesebrow et al. | 235/380 |
| 6,216,874 B1 | 4/2001 | Bores et al. | 206/711 |
| 6,267,245 B1 | 7/2001 | Bores et al. | 206/711 |
| 6,354,601 B1 | 3/2002 | Krampotich et al. | 277/628 |
| 6,428,729 B1 | 8/2002 | Bhatt et al. | 264/254 |
| 6,439,984 B1 | 8/2002 | Andres | 451/398 |
| 6,902,059 B2 * | 6/2005 | Whalen et al. | 206/711 |

FOREIGN PATENT DOCUMENTS

| | | |
|---|---|---|
| EP | 0 266 902 A1 | 5/1988 |
| GB | 2 200 895 A | 8/1988 |

OTHER PUBLICATIONS

US 5,762,201, 06/1998, Whalen (withdrawn)

* cited by examiner

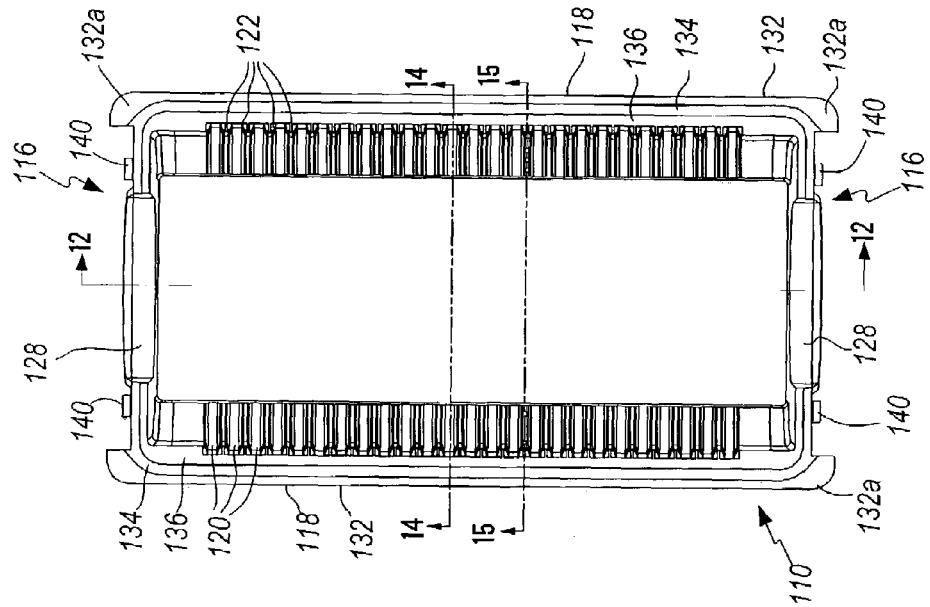
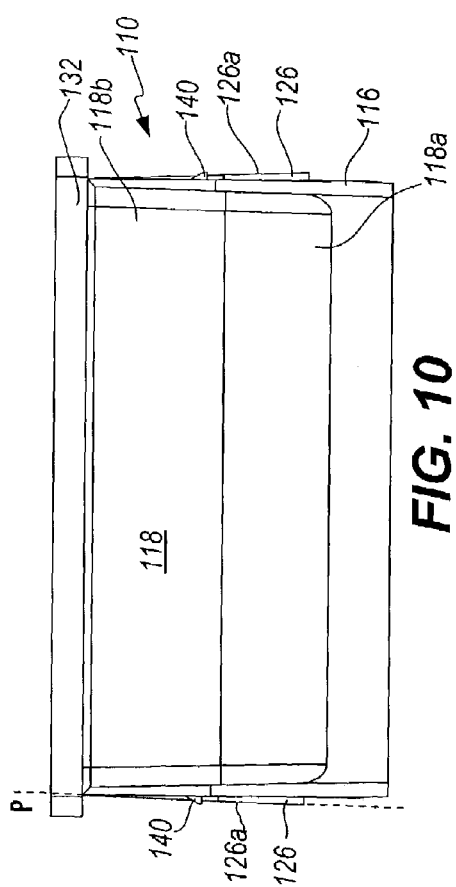
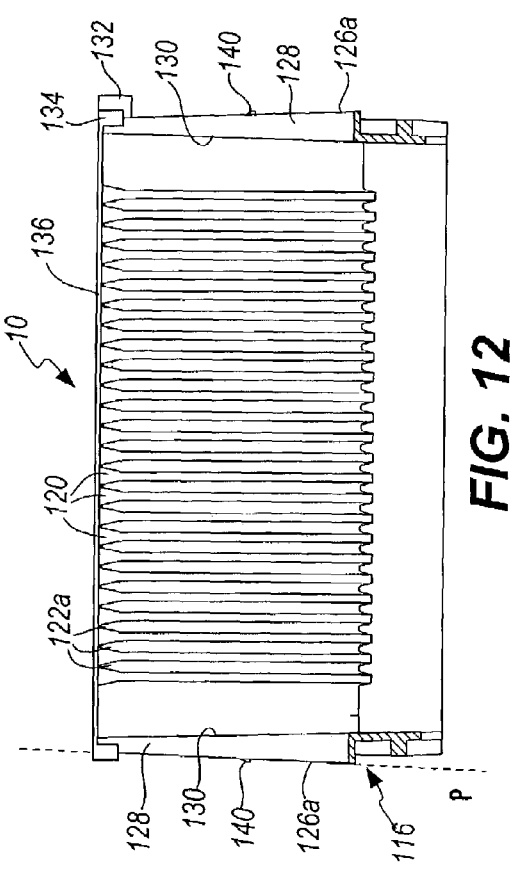

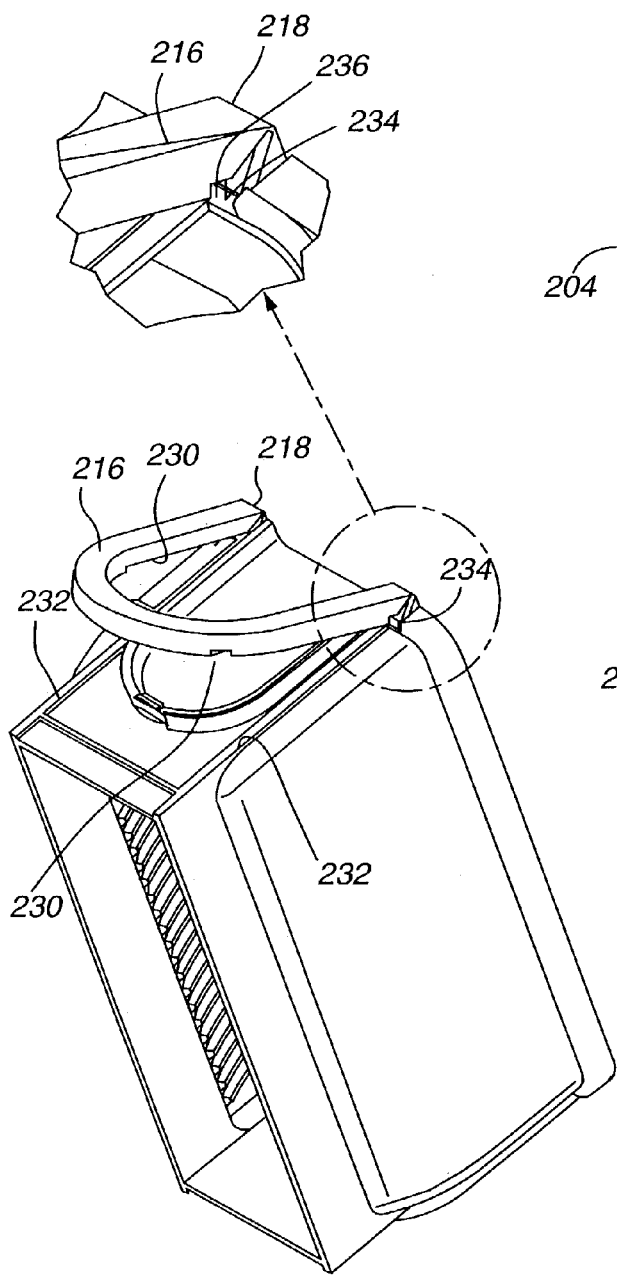
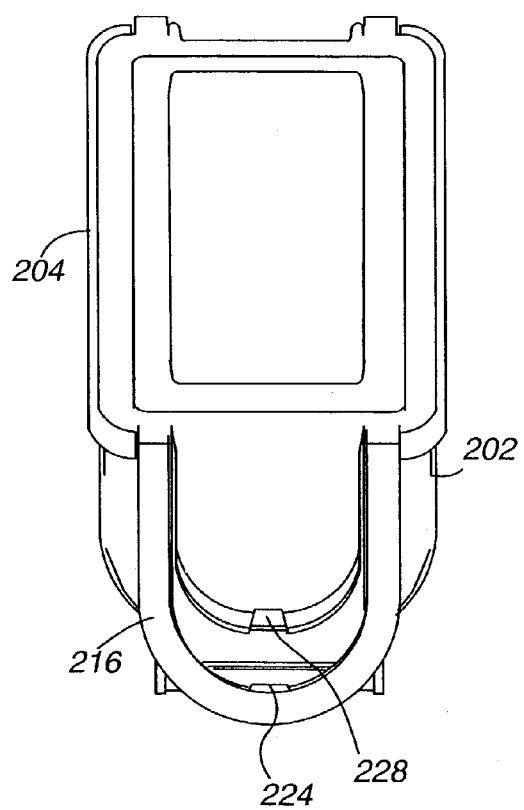
FIG. 27
FIG. 28
FIG. 26

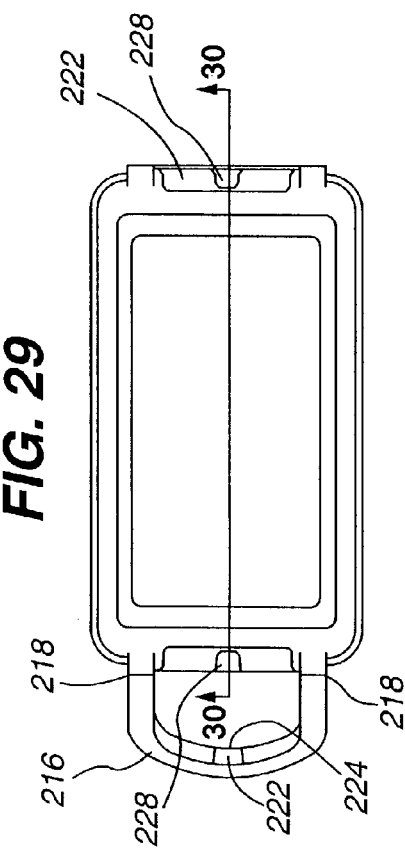
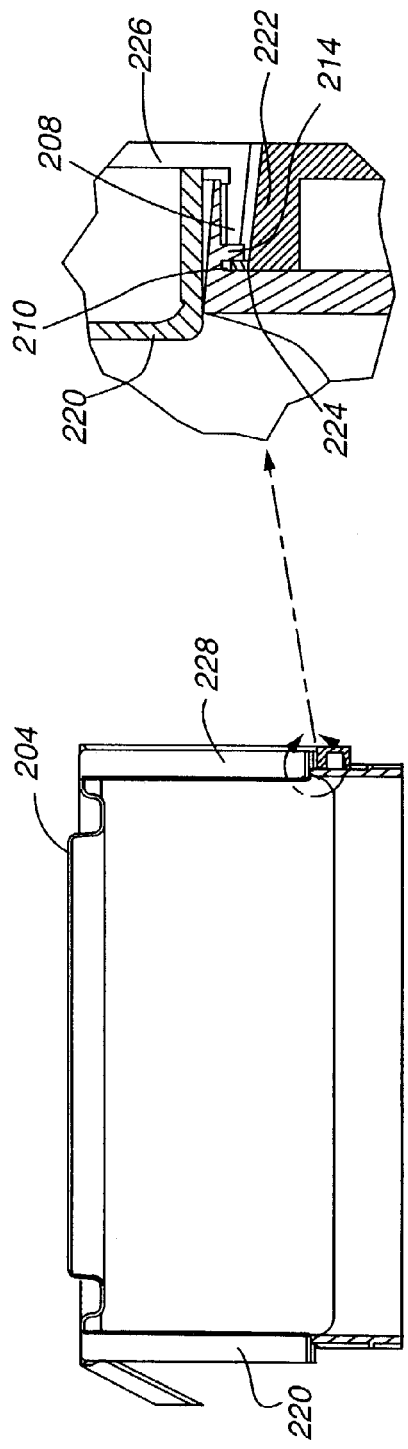

MEMORY DISK SHIPPING CONTAINER WITH IMPROVED CONTAMINANT CONTROL

CROSS-REFERENCE TO RELATED APPLICATIONS

Priority is claimed from U.S. Provisional Patent Application Ser. Nos. 60/377,876 filed May 3, 2002 and 60/403,819 filed Aug. 14, 2002, which are incorporated by reference herein in their entirety.

FIELD OF THE INVENTION

This invention relates to containers for storing and transporting memory storage disks, such as magnetic and optical disks. More particularly it relates to such a container with an improved latching mechanism and one with a more robust design.

BACKGROUND OF THE INVENTION

Storage disks are utilized in the computer industry, as well as other ever-expanding applications, for storage of information. Storage disks may be made of metal or glass and are subjected to a number of processing steps. Such storage disks must be transported, not only within the place of manufacturing during processing, but from the processing and manufacturing facilities to the manufacturing facility where the disks are placed in end use devices, such as disk drives. The disks are typically transported in plastic containers adapted for providing a generally sealed enclosure along with protection of the disks. It is critical for the disks that the enclosure be very clean and preclude entry of particles or other containments. Particles or other containments in the containers can adhere to the disks causing damage or necessitating additional cleaning steps.

Containers for storage disks have become generally standardized in their configuration as shown in Prior Art FIGS. 1–8. Such disk storage containers have three principal parts, a main body or cassette 20, a top cover 22 and a bottom cover 24. These component parts are generally molded from thermoplastic materials such as polycarbonate, polypropylene and the like.

The cassette is generally boxed shaped with an open top 26, an open bottom 28, a plurality of slots 30 typically formed by inwardly projecting ribs 32 disposed on the side walls 34 hold the disks in an axial arrangement. U-shaped openings or recesses 36 extend downwardly from the top edge 38 into the end walls 40 allow axial access to the disk apertures. The top covers generally have rectangular top portion 42 and two end portions 44 which extend downwardly from the top portion. The end portions close the openings 36 in the end walls 40.

Different means have been utilized to latch the top cover 22 to the cassette 20. One such latching means is shown in the Prior Art FIGS. 1 and 2 and is disclosed in U.S. Pat. No. 4,557,382. This embodiment utilizes end portions 44 that extend slightly inward to create an interference fit with the cassette. The end portions 44 must be flexed or deformed outwardly for the top cover 22 to be lowered and close the cassette. The top cover is then held in place by the inward bias or spring action of the end portions 44 and also by a frictional engagement between the catch edge 48 of the end portion 44 and a complementary locking catch 50 on the end wall 40 of the cassette 20. One potential disadvantage of the top cover latching mechanism of FIGS. 1 and 2 is that the inward bias of ends 44 can diminish or lessen outwardly over time such that the spring action or inward bias is reduced or, perhaps, lost. Additionally, some level of finesse is required to lower the top cover onto the cassette without making scrapping contact between the end portions 44 and any disks in the cassette or with the locking catch 50 of the end walls, which contact can generate contaminants. Additionally, there have been concerns that the engagement between catch edge 48, lip 49 and the locking catch 50 does not create a secure latch or an adequate seal, particularly around the entire length of the opening 36 in the end wall.

A second Prior Art reference is illustrated in FIGS. 3, 4, and 5 and is described in more detail in U.S. Pat. No. 5,253,755. This embodiment shows a disk container with a top cover 22 having an end portion 44 with a structural offset portion 54 shaped to snugly nest within the curvature of opening 36 formed by lip 56 of the U-shaped recess 36. This structural offset forms a seal with respect to the opening 36. In this Prior Art disk container, the top cover 22 is lowered down to the cassette and snaps into the engagement position as shown in FIG. 5. The ramped surface 58 engages the edge 56 of the opening as it is being lowered down and continued downward pressure on the top portion of the top cover urges the engagement member 60 outwardly to clear the edge 56 as shown in FIG. 5. Although this particular latching arrangement and top cover configuration has generally been accepted by the industry, concerns have been raised that such a snap-in top cover operates to launch particles from the top cover and cassette during the snap action. Said particles would thus be airborne and may end up as containments on the magnetic disks. Therefore it is desirable to have a latching mechanism that is not subject to the creep and sealing problems associated with the embodiment in FIGS. 1 and 2 and that also does not utilize the snap action of either of these embodiments.

A third Prior Art reference, U.S. Pat. No. 6,070,730, attempted to address the foregoing problems. This design is shown in FIGS. 6, 7 and 8. In this structure, like that disclosed in FIGS. 3–5, the top cover 22 includes end portions 44 having a structural offset portion 54 that rests within the opening 36 of the end wall of the cassette. However, the end portion 44 of the top cover 22 further includes an integral extension 62, disposed below the offset portion, and connected to the end portion by a hinge element 64. The locking members comprise a ramped surface 58 and engagement ledge 60 formed on the inside of the integral extension 62. The engagement ledge 60 is secured by opposed locking ledge 66 formed on the end wall 44 of the cassette 20. In this manner, the locking members 60 and 66 are physically separated from the structure 54 that closes the U-shaped opening 36. Also, there is no spring action or inward bias of the end portion 44 that causes particles to be projected into the container. Rather, the extension 62 must be affirmatively pressed inwardly to create engagement between engagement ledge 60 and locking ledge 66. Ramp 58 provides assistance if the cover is not squarely seated on the cassette. However, such affirmative action on the part of the operator is one draw back of the design. It is possible that the operator may not cause the integral extension 62 to fully engage the locking members, thereby creating the possibility that the cover would not be secure or could be unintentionally removed from the cassette leading to contamination of the contents. In addition, with repeated use, the hinge may weaken and tear or the locking members 60 and 66 may wear away, thereby diminishing their locking ability. This would render the container unuseable.

SUMMARY OF THE INVENTION

The present invention relates to an improved latching mechanism for use with a container for storing and transporting memory disks. The container comprises a base unit or cassette with sidewalls having inwardly facing ribs or slots within the sidewalls for holding disks in an axial alignment, two opposite end walls each having a U-shaped recess extending downwardly from the open top, a top cover with a top portion and two end portions extending downwardly to close and seal the open top of the cassette and the U-shaped recess, and a bottom cover to close and seal the open bottom of the cassette. The end portions of the top cover include a structural offset that extends into the U-shaped recess to assist in closing and sealing the opening. A U-shaped locking member surrounds each end portion outside the periphery of the end portion and includes a latching mechanism to secure the top cover to complementary latching members disposed on the cassette. In the preferred embodiment, the U-shaped locking member is integrally formed with the top portion of the top cover and has limited flexibility allowing it to distort slightly as part of the locking process. In the same preferred embodiment, the latching mechanisms comprise a pair of cams disposed on the U-shaped locking member, on opposite sides of the end portion, together with a pair of opposed cams disposed on the end wall of the cassette which interact to secure the cover to the cassette.

In an alternative embodiment, the U-shaped locking member may be joined to the top portion of the top cover by a hinge, allowing the U-shaped locking member to pivot outwardly and inwardly relative to the end wall of the cassette. The latching mechanisms may remain the same opposed camming surfaces with interlocking surfaces, or may comprise alternatives, such as a hook portion positioned on each end wall of the cassette and a complementary hook receiving portion on the U-shaped locking member (or vice versa). It may also comprise a post and aperture arrangement, a fictional engagement between the U-shaped locking member and the cassette end wall, a pair of complementary interlocking ridges or lips or other structures known to those of skill in the art. In any case, the locking member secures the top cover in place on the cassette under appropriate tension to adequately seal the opening. Additionally, the cassette may include a shoulder disposed near the hinge of the U-shaped locking member and the U-shaped locking member may include a cut-out portion which engages the shoulder on the cassette to assist in securing the top cover to the cassette. In this configuration, the shoulder lock will hold the top cover to the cassette, allowing a separate latching mechanism to secure the U-shaped locking member to the cassette.

An advantage and feature of the various embodiments of the present invention is that the top cover is sealed and latched to the cassette without a snap action that can generate and launch particles onto the contents of the cassette, while not requiring any affirmative locking action by the user other than pressing the cover onto the cassette. In addition, due to the mechanical advantage caused by the placement of the latch engagements, the top cover can be more easily unlatched than snap-on top covers or other conventional covers.

BRIEF DESCRIPTION OF THE DRAWINGS

FIG. 10 is a side elevation view of the disk shipper illustrated in FIG. 9.

FIG. 11 is a top plan view of the base of the disk shipper illustrated in FIG. 9.

FIG. 12 is a cross-sectional side view of the base of the disk shipper illustrated in FIG. 9, taken along line 12—12 of FIG. 11.

FIG. 26 is a perspective view of the alternative embodiment of the disk shipper of FIG. 24, shown with the cover partially engaging the base.

FIG. 27 is an enlarged view of a portion of the latching mechanism of the disk shipper illustrated in FIG. 26.

FIG. 28 is a perspective view of the disk shipper of FIG. 24, showing the latching mechanism in a partially-open position.

FIG. 29 is a top plan view of the disk shipper of FIG. 24, with one latching mechanism open.

FIG. 30 is a cross-sectional side view of the base and top cover of the disk shipper illustrated in FIG. 29 taken along line 30—30 of FIG. 29.

FIG. 31 is an enlarged view of a portion of the latching mechanism of the disk shipper illustrated in FIG. 30, showing the latching mechanism in an engaged position.

DETAILED DESCRIPTION OF THE PREFERRED EMBODIMENT

Figure 1:
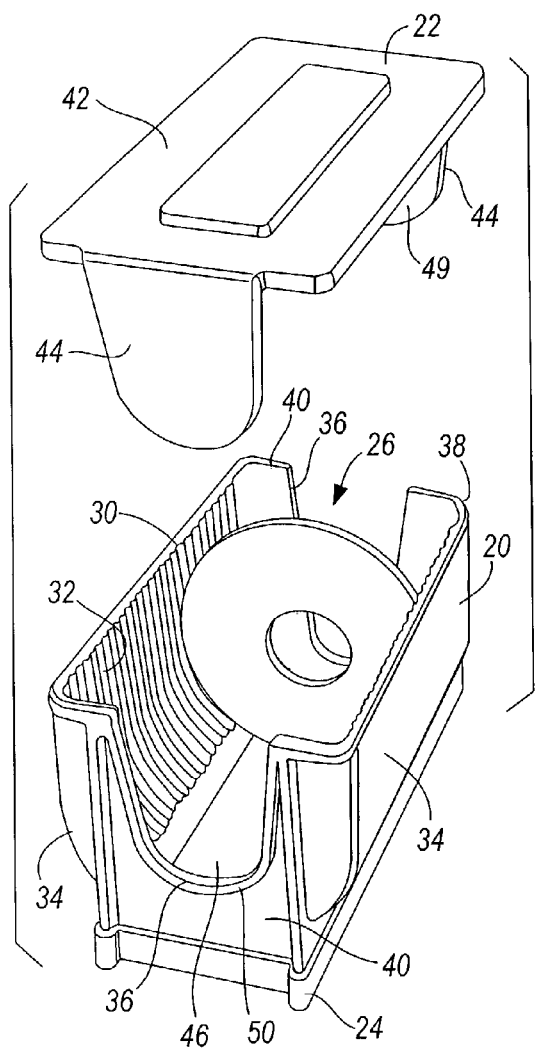
FIG. 1 is an exploded perspective view of a prior art disk shipper.
Figure 2:
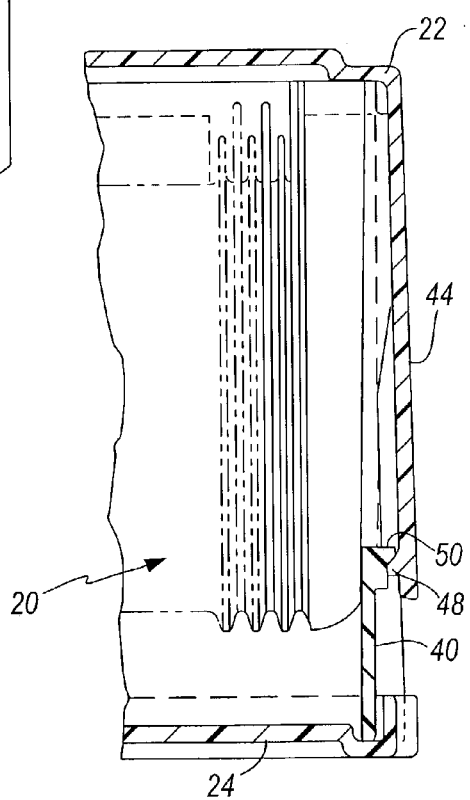
FIG. 2 is a cross-sectional view of the latching mechanism of the prior art shipper of FIG. 1.
Figure 3:
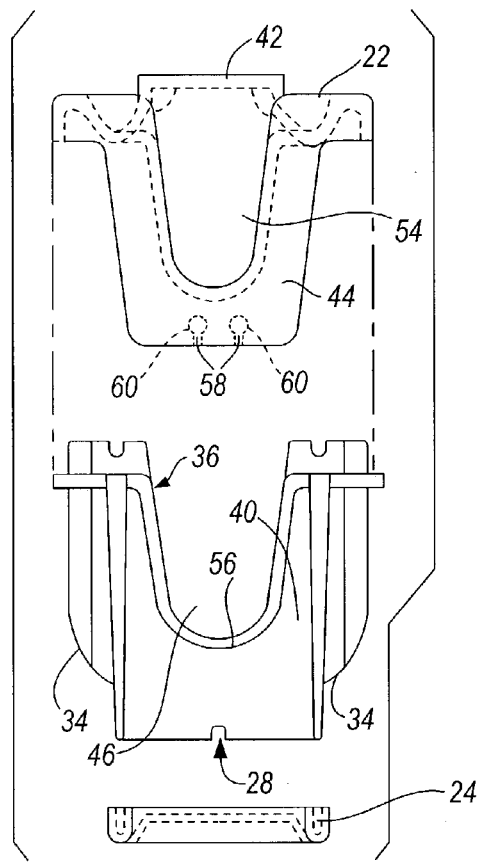
FIG. 3 is an elevational view of the component parts of a second prior art disk shipper.
Figure 4:
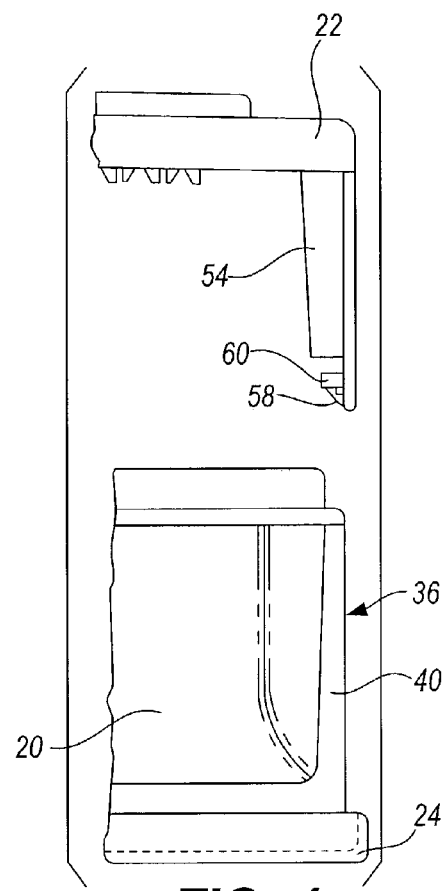
FIG. 4 is an elevational view of a portion of the prior art disk shipper of FIG. 3.
Figure 5:
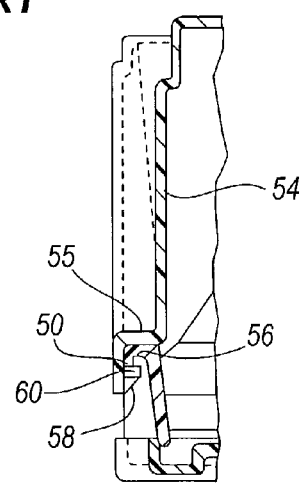
FIG. 5 is a cross-sectional view of the latching mechanism of the prior art shipper of FIGS. 3 and 4.
Figure 7:
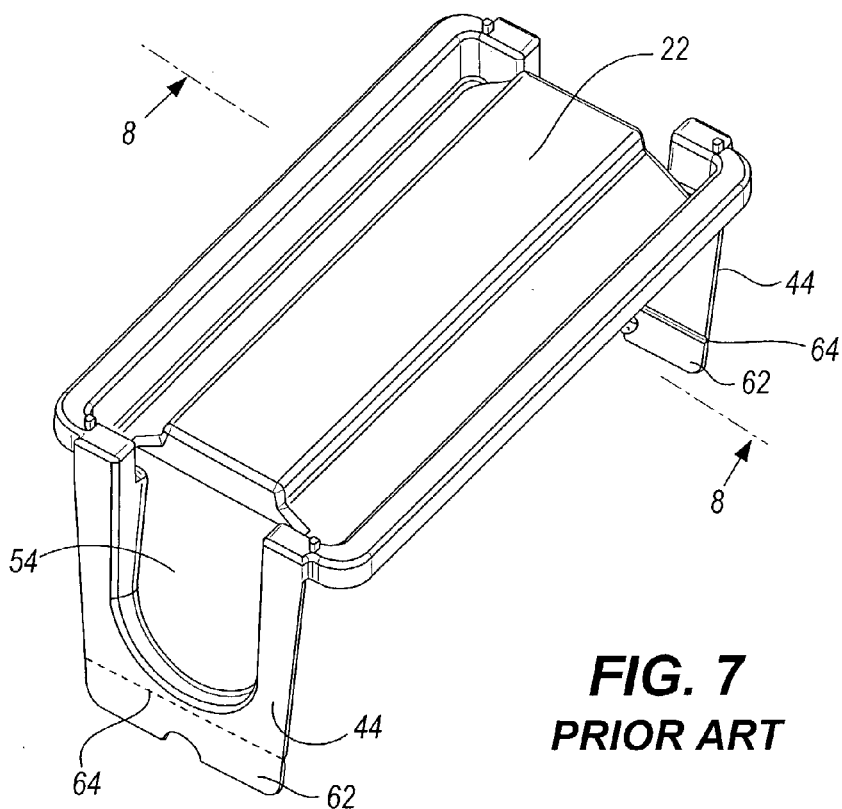
FIG. 7 is a perspective view of the top cover of the prior art shipper of FIG. 6.
Figure 6:
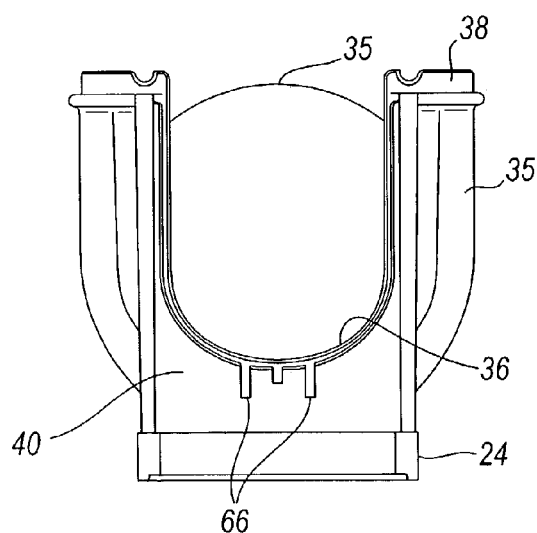
FIG. 6 is an elevational view of a third prior art shipper.
Figure 8:
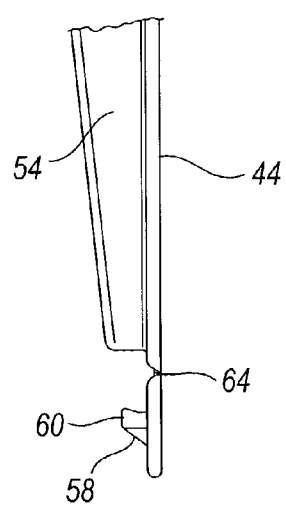
FIG. 8 is an elevational view of the end portion of the prior art top cover illustrated in FIG. 7.
Figure 9:
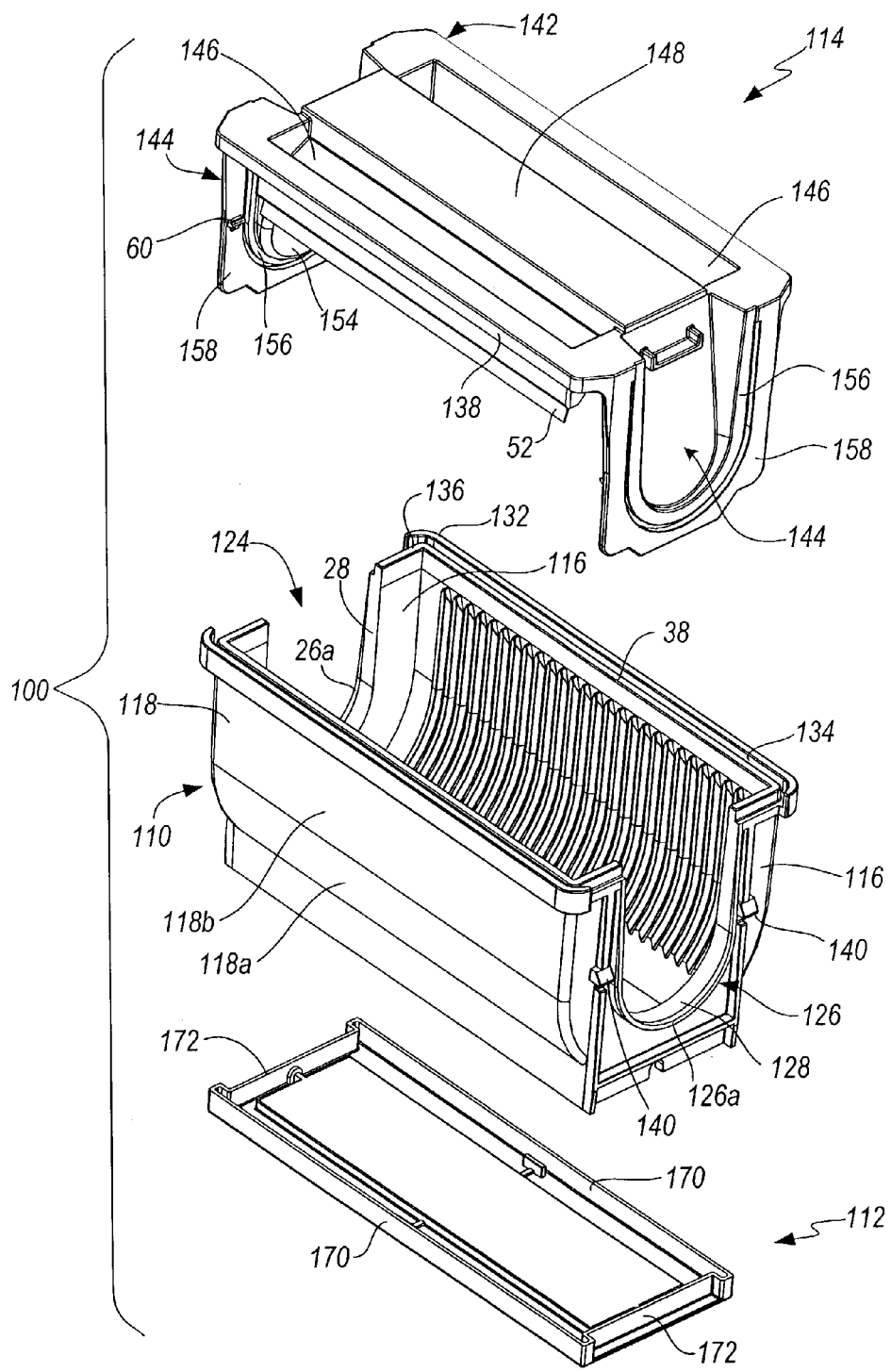
FIG. 9 is an exploded perspective view of a first embodiment of the disk shipper of the present invention.
Figure 14:
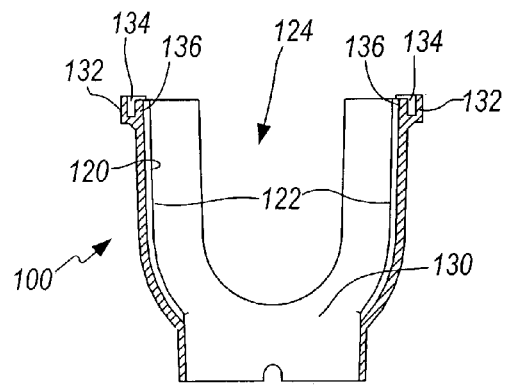
FIG. 14 is a cross-sectional end view of the base of the disk shipper illustrated in FIG. 9, taken along line 14—14 in FIG. 11.
Figure 15:
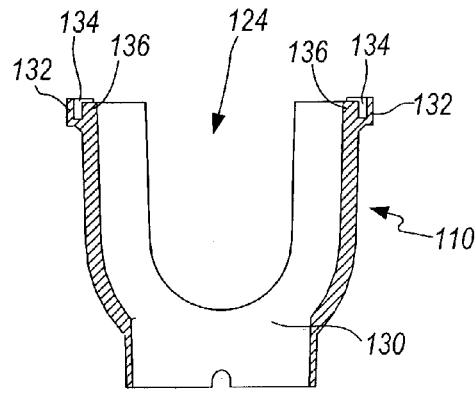
FIG. 15 is a cross-sectional end view of the base of the disk shipper illustrated in FIG. 9, taken along line 15—15 in FIG. 11.
Figure 13:
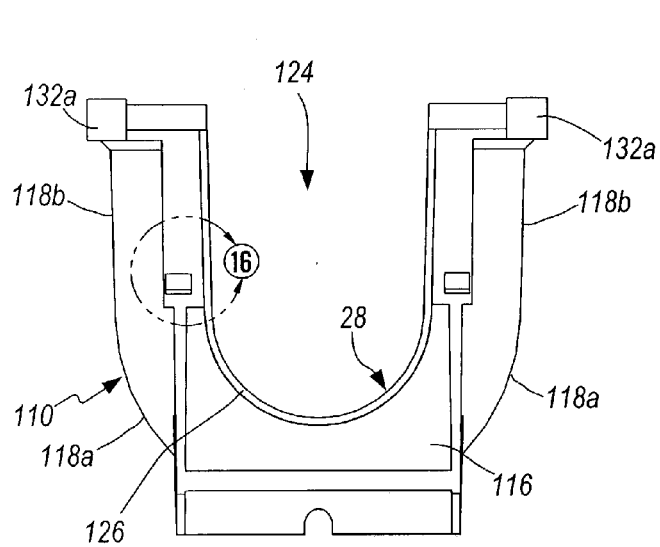
FIG. 13 is an end elevation view of the base of the disk shipper illustrated in FIG. 9.
Figure 16:
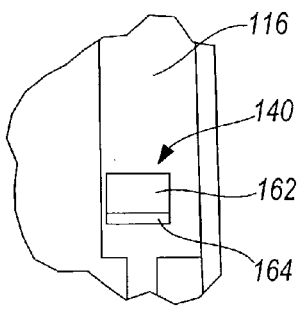
FIG. 16 is an enlarged end view of a portion of the latching mechanism of the disk shipper illustrated in FIG. 13.
Figure 17:
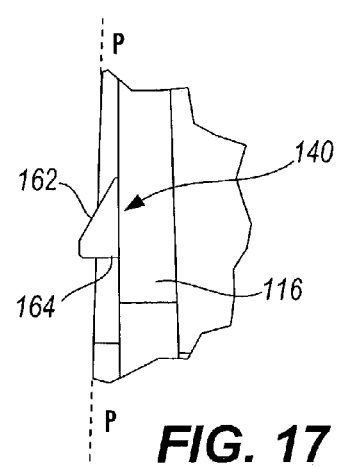
FIG. 17 is an enlarged side elevation view of a portion of the latching mechanism of the disk shipper illustrated in FIG. 16.
Figure 18:
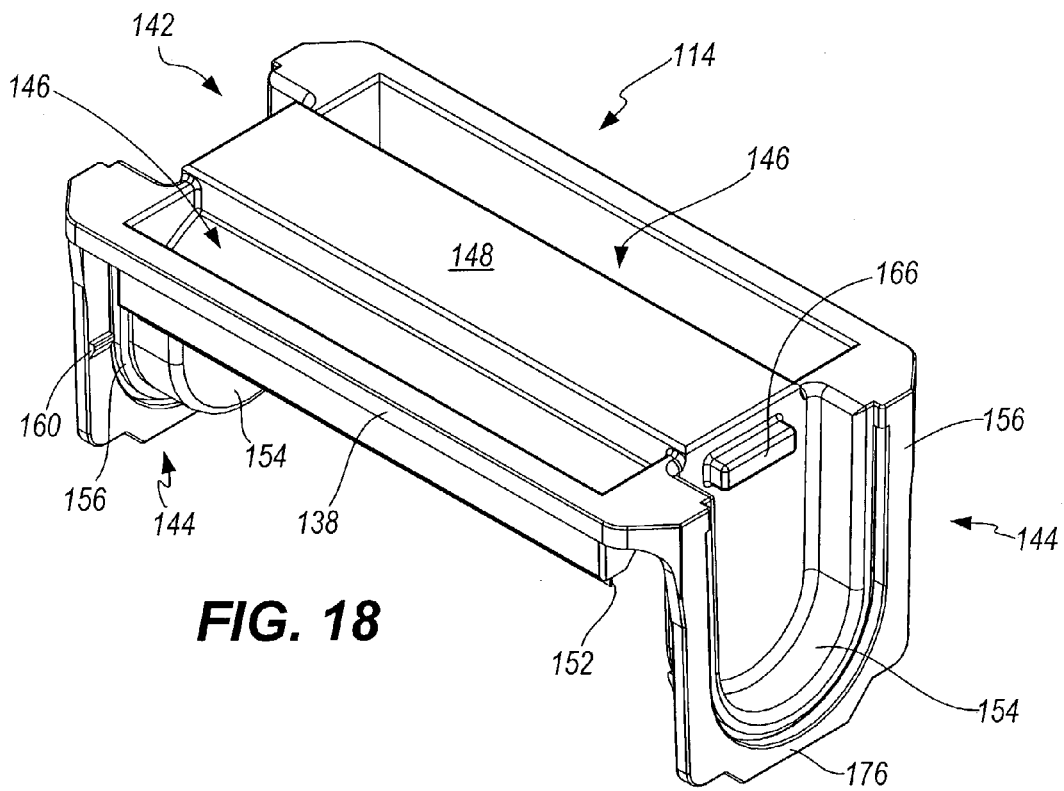
FIG. 18 is a perspective view of the cover of the disk shipper illustrated in FIG. 9.
Figure 19:
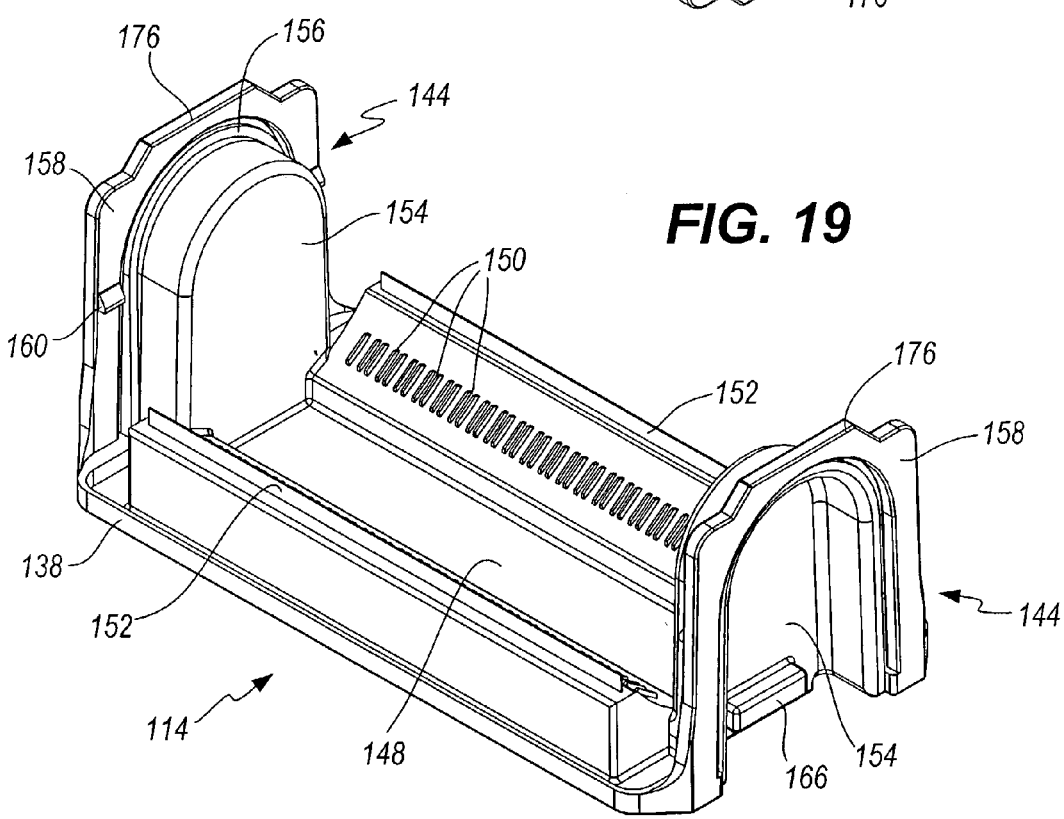
FIG. 19 is a perspective view of the cover of the disk shipper illustrated in FIG. 9, but upside down compared to FIG. 18.
Figure 20:
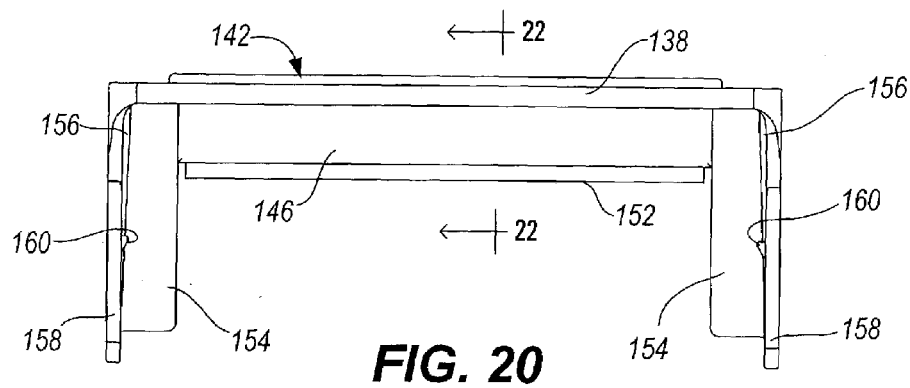
FIG. 20 is a side plan view of the cover of the disk shipper illustrated in FIG. 9.
Figure 21:
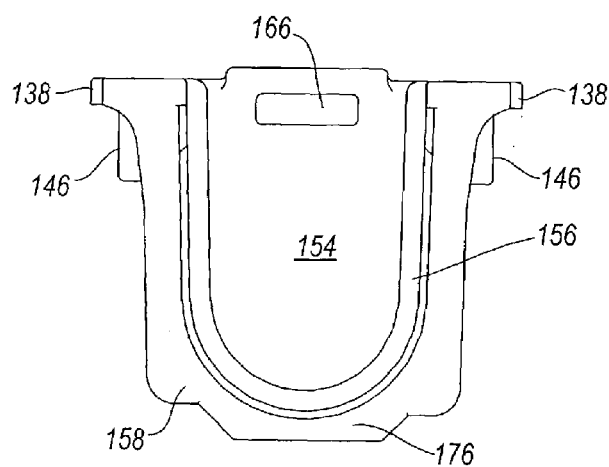
FIG. 21 is an end plan view of the cover of the disk shipper illustrated in FIG. 9.
Figure 22:
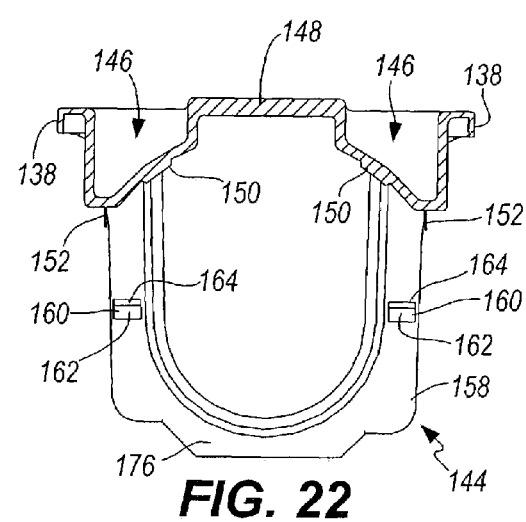
FIG. 22 is a cross-sectional end view of the cover of the disk shipper illustrated in FIG. 9, taken along line 22—22 of FIG. 20.
Figure 23:
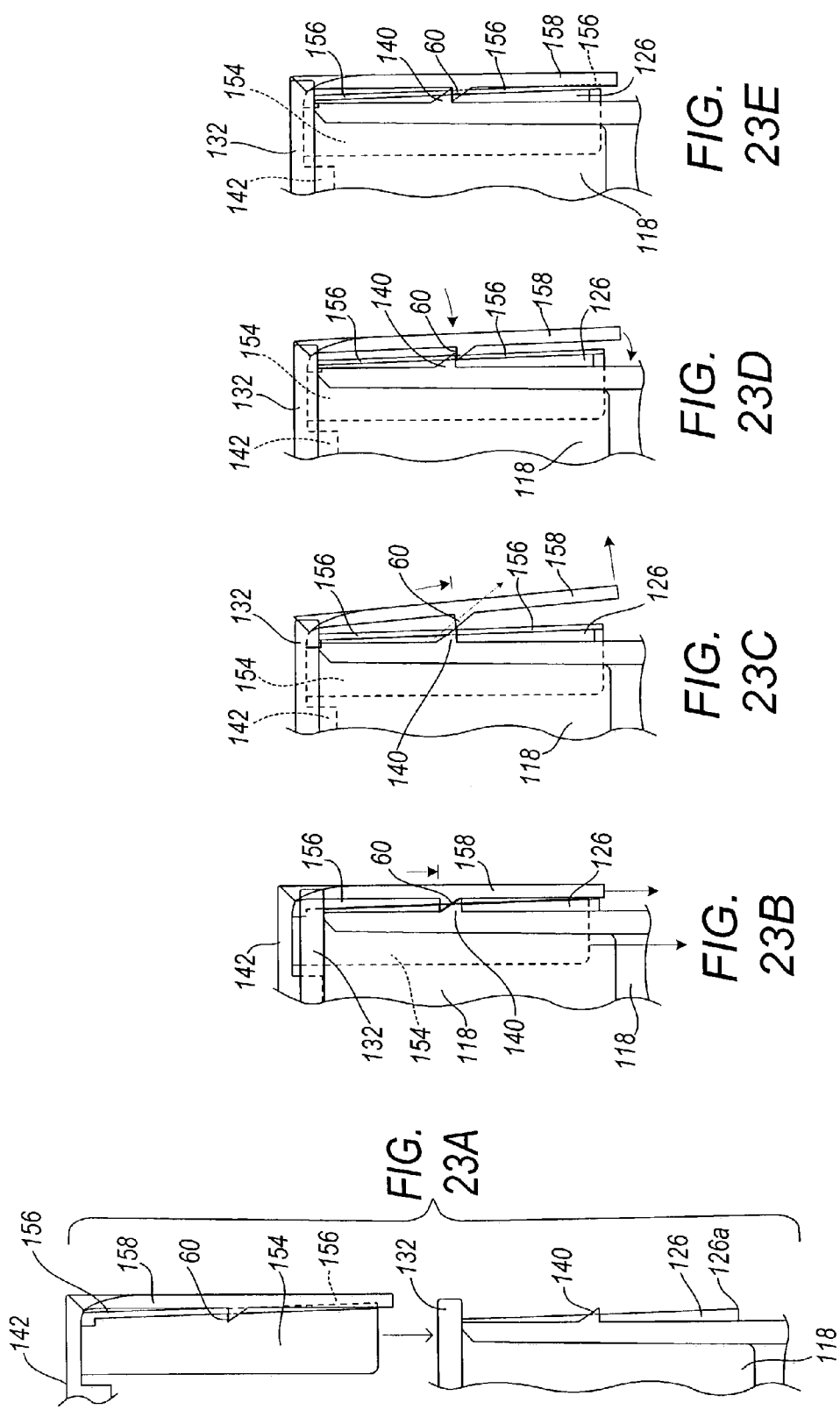
FIG. 23A is a partial side view of the latching mechanism of the disk shipper illustrated in FIG. 9, depicting the cover moving downward relative to the base and prior to latching.
FIG. 23B is a partial side view of the latching mechanism of the disk shipper illustrated in FIG. 9, depicting the cover seated on the base prior to latching.
FIG. 23C is a partial side view of the latching mechanism of the disk shipper illustrated in FIG. 9, depicting the cover flexing to accommodate interaction of the latching mechanism prior to latching.
FIG. 23D is a partial side view of the latching mechanism of the disk shipper illustrated in FIG. 9, depicting the cover flexing to accomplish latching.
FIG. 23E is a partial side view of the latching mechanism of the disk shipper illustrated in FIG. 9, depicting the cover latched to the base.
Figures 24, 25:
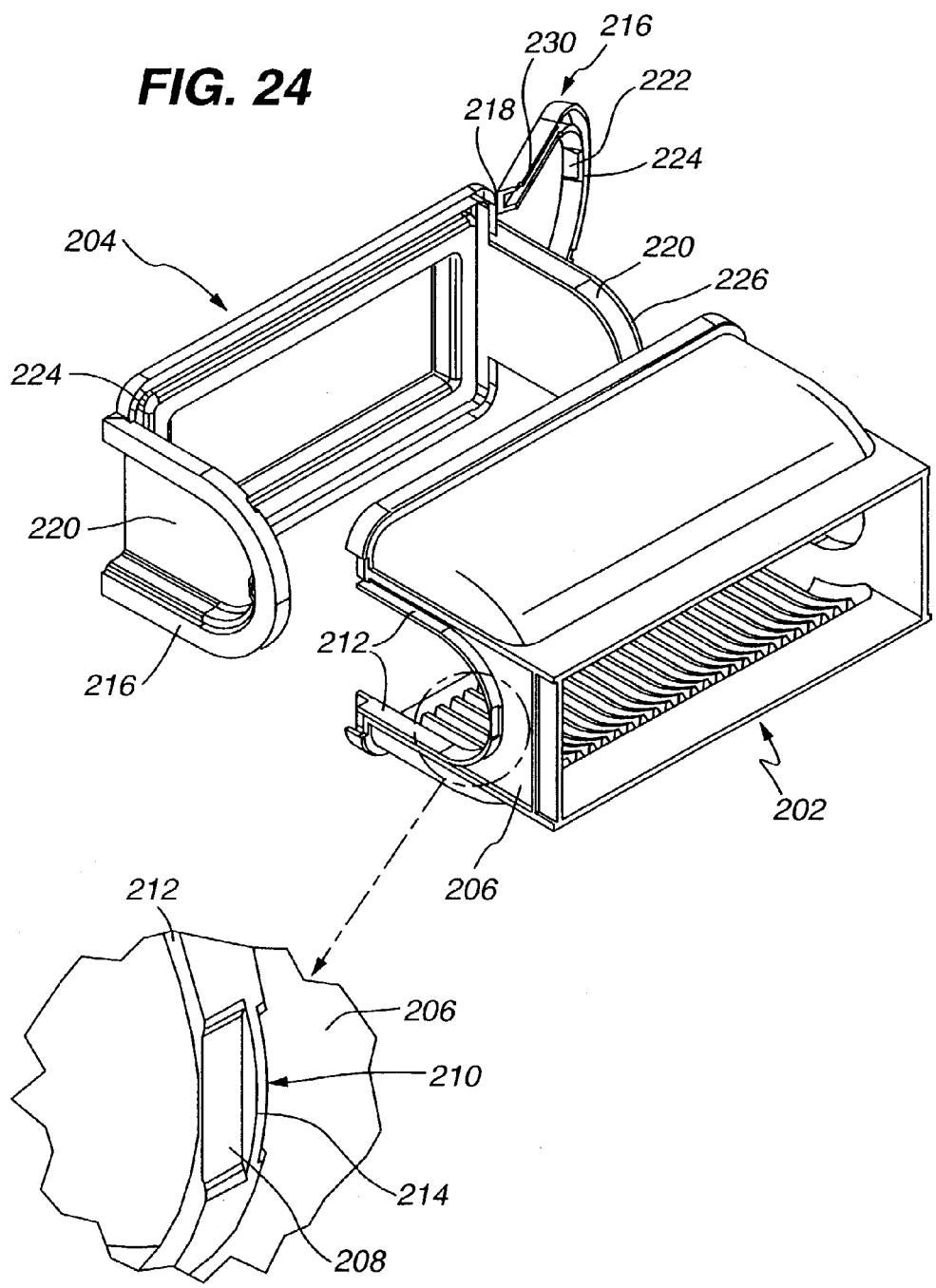
FIG. 24 is an exploded perspective view of an alternative embodiment of the present invention.
FIG. 25 is an enlarged view of a portion of the latching mechanism of the disk shipper illustrated in FIG. 24.

Referring first to FIG. 9, a first embodiment of the invention is shown in the context of a shipping and storage container for memory disks generally designated with the numeral 100. When used alone herein, "disk" should be considered as any type of memory disk, including both magnetic and optical memory disks. In general terms and with reference to the drawings, the disk shipper is comprised of three pieces: a base or cassette 110 having an open top, open bottom and open ends; a bottom cover 112 for enclosing the open bottom of the cassette and, a top cover 114 for enclosing the open top and open ends of the cassette. The cassette, as illustrated in more detail in FIGS. 10–17, has two end walls 116 and two parallel side walls 118 extending between the end walls. Slots 120 are formed in the side walls of the cassette by inwardly extending teeth or ribs 122. The slots are configured to hold magnetic disks in parallel axial alignment by engaging the outer edge portions of the disks. The side walls 118 are uniform in thickness throughout the curved portion 118a and the upper vertical portion 118b. As best seen in FIG. 15, the ribs 122 are uniform in height relative to the inside surface of the side wall. As best seen in FIG. 12, the upper portion of the ribs 122a extend to the top 36 of the side wall 118 and are tapered in width to enlarge the gap between adjacent ribs to facilitate receiving and removing disks. There are no exterior ribs or strengthening members on the outside surface of the side walls.

The end walls 116 include a U-shaped opening 124 extending downwardly from the top edge of the cassette. (See FIGS. 13–15.) A saddle 126 is formed along the edge of the U-shaped opening and has a surface 128 that is perpendicular to the plane of the opening (see FIG. 11). The internal surface 130 of the end wall is vertical, however, the outer edge or surface of the saddle 126a extends a further distance at the bottom of the opening compared to the top, defining a plane P that lies at an angle relative to the vertical end wall 130 (FIGS. 10, 12, 17 and 23B). An outer, buffer wall 132 is positioned outwardly from the top edge 136 of the open base along the side walls 118 and defines a channel 134 between itself and the upper edge 136 of the side wall of the cassette (see FIGS. 9, 11, 14 and 15). This outer wall or buffer creates a shield to protect the perimeter edge 138 of the top cover from impact by positioning the perimeter edge of the cover within the channel 134. Each of the ends of the outer wall are thickened, such as at 132a, to create further rigidity and protection from impacts against the end walls and corners of the shipper that occur during use. A pair of wedge-shaped locking cams 140 are positioned on each end wall 116 laterally outside of the U-shaped opening 124 and form part of the locking mechanism for securing the top cover 114 to the cassette 110. The locking cams 140 include a camming surface 162 and a locking surface 164. The bottom cover 112 is held on the opened bottom of the cassette by a friction fit with the side walls 118 and end walls 116 of the cassette 110 and side walls 170 and end walls 172 of bottom cover 112.

As illustrated in FIGS. 18–22, the top cover 114 includes a generally rectangular portion 142 with integral downwardly extending end portions 144. A perimeter edge 138, extending between the end portions 144 and downwardly from the rectangular portion 142, is formed at the outer perimeter of the rectangular portion. This edge or lip 138 fits within the channel 134 formed along the upper edge 136 of the side walls 118 of the cassette and is protected from impact by the outer wall or buffer 132 of the cassette. The rectangular portion further includes two recesses 146 which extend parallel to each other adjacent the outer edge of the rectangular portion and are spaced by a central planar portion 148. A row of inwardly projecting ribs or teeth 150 extend along the inner surface of each recessed portion and are aligned with ribs 122 formed in the side walls of the cassette to further secure the magnetic disks within the shipper. A flexible skirt 152 disposed along the length of the lower surface of each recessed portion 146 and outwardly of the teeth 150 engages the perimeter edges of the memory disks to dampen movement of the disks within the shipper.

The end portions 144 of the top cover include a U-shaped structural offset or seal member 154 designed to nest against surface 128 within the U-shaped opening 124 of the cassette and generally seal the opening. An outer flange 156 of each end portion, best seen in FIGS. 18 and 23A–C, is contoured to abut against the non-vertical outer edge 126a of the saddle 126 along the plane P. The non-vertical profile of edge 126a promotes sealing of the opening by gradually forcing flanges 156 outwardly. Given the molded construction of the top cover, this creates an inward force by the end portion 144 against the cassette end wall which keeps flange 156 fully engaged against surface 126a.

Each end portion further includes a separate locking member or yoke 158 which is spaced outwardly from the end portion 144. A pair of complementary wedges 160 are located on the yoke member to engage and cooperate with the wedges 140 disposed on the end walls of the cassette. Thus, and with reference to FIGS. 23A–C, as the cover is moved downwardly to nest on the cassette, the camming surfaces 162 of the complementary wedges 140, 160 engage each other to force the locking member 158 outwardly from the base unit until the camming surfaces pass each other, allowing the locking member 158 to snap inwardly and the locking surfaces 164 to engage to thereby secure the cover to the base. The locking occurs outwardly of the opening 124 and without movement of U-shaped offset portion 154 allowing the U-shaped offset portion to maintain its seal of opening 124. A pair of handles 166 may be included on each end portion to assist in handling the top cover 114 during locking and in handling the entire container when the cover is latched to the base. It should be appreciated that the locking member 158 is separate from the end portion 144. Although not shown in the figures, it should also be appreciated that the locking member 158 may alternatively comprise two independent separate arms which are not connected. The bridge portion 176 interconnecting the two arms does facilitate latching and unlatching the cover to the base by allowing the pair of wedges 160 to be operated simultaneously.

With this locking mechanism, the locking features of the disk shippers are separated from the sealing features to prevent dust and other particles from contaminating the memory disks stored at each end of the base unit as the cover is engaged with the base portion. In other words, the U-shaped offset portions 154 which seal the open U-shaped end 124 of the base do not snap into position or otherwise cause particles to be projected into the interior of the base unit during the securement of the top cover to the base unit. Moreover, because the locking member 158 is spaced outwardly and separate from the U-shaped offset portions 154, the U-shaped open end 124 is sufficiently sealed by offset portion 154 such that the snap action of locking member 158 does not contaminate the interior of the shipper. Moreover, the locking will occur almost automatically by simply pressing the cover onto the base; no separate or affirmation locking step is needed. Thus, closing and securing the cover 114 to the cassette 110 can be accomplished in a single, one-dimensional movement between the cover and cassette. In addition, because the locking member 158 is separate from the U-shaped offset 154, the regular flexing of the locking member 158 will not diminish the inward bias of the U-shaped offset portion 154, thereby maintaining a sealed closure over a longer product life span.

A second embodiment of the present invention is shown in FIGS. 24–31. In this embodiment, the base or cassette 202 and the top cover 204 remain generally the same. However, the latching mechanism is different. Turning to the cassette 202, and more particularly, the end walls 206, a pair of cutout portions 208 and 210 are formed on the underneath surface of the lower portion of the saddle 212 to create a ridge or lip 214 (see FIG. 25). The lip 214 cooperates with a locking member associated with the top cover to secure the cover to the cassette.

As shown in FIGS. 24, 26, 27 and 29, the top cover 204 includes a locking member 216 pivotally attached to the top cover 204 by a hinge 218. The hinge 218 permits the locking member 216 to pivot relative to the top cover while, simultaneously, the U-shaped structural offset 220 is sealably nested within the saddle 212 when the top cover 204 is properly seated on the cassette 202. This allows the locking member 216 to pivot upwardly and downwardly about the end of the rectangular portion of the top cover, while the U-shaped offset 220 remains stationary. As best seen in FIG. 31, the locking member 216 further includes a raised portion 222 that includes a lip 224 at its inner edge. The lip 224 engages the lip 214 of the base portion when the locking member 216 member is pressed against the end wall 206 of the base 202 to secure the U-shaped locking member 216 to the base 202. To accommodate the raised lip 224 on the locking member 216, the lower portion of the U-shaped offset 220 must also be modified. As seen in FIG. 28, unlike in the preferred embodiment, the flange 226 positioned at the perimeter of the U-shaped offset 220 is not continuous. Instead, at the lower curve of the U-shaped offset 220, the flange 226 terminates and a raised portion 228 is formed to provide clearance for the raised lip 224 as it moves between a latched and unlatched position.

As shown in FIG. 26, the U-shaped locking member 216 further includes cutouts 230 which allow the U-shaped member 216 to accommodate the structural ribs 232 formed along end wall 206 of the base 204. Similarly, notches or cutouts 234 are also formed in the U-shaped locking member 216, proximate the hinges 218, to accommodate other ribs or strengthening members 236 formed in the end wall 206 of the base 202. As should be appreciated, the cutouts can vary in location and size to accommodate unique structural features in the cassette body, while still permitting the locking member 216 to fully engage the complementary locking elements of the cassette.

Figure 32:
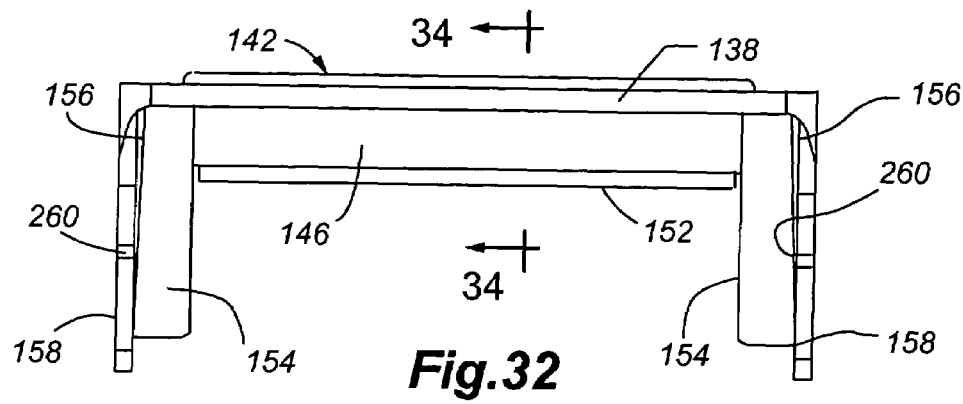
FIG. 32 is a side plan view of an alternative embodiment of the cover of the disk shipper illustrated in FIG. 9.
Figure 33:
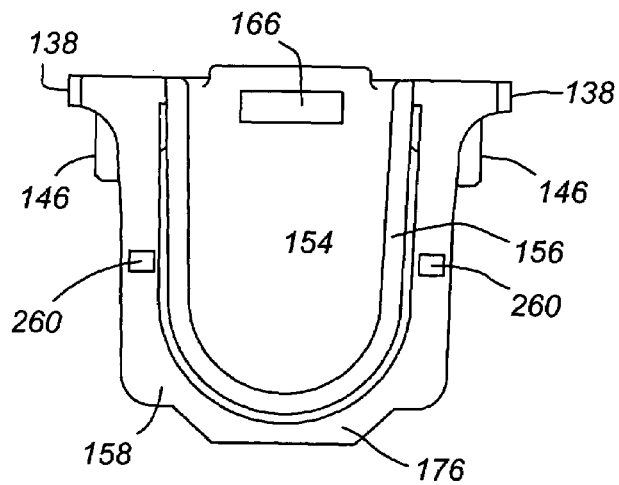
FIG. 33 is an end plan view of the cover of the disk shipper illustrated in FIG. 32.
Figure 34:
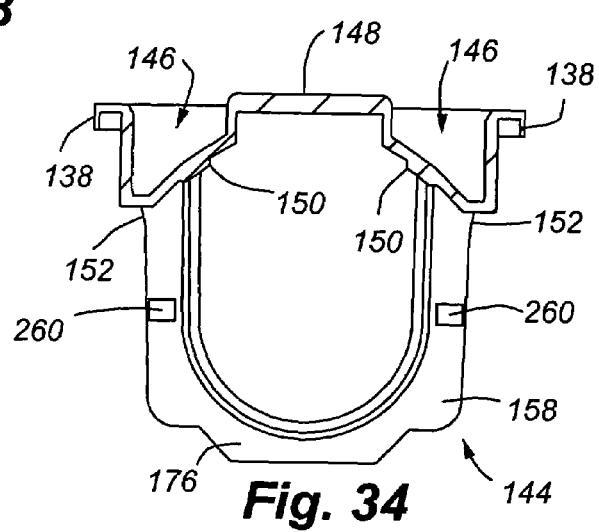
FIG. 34 is a cross-sectional end view of the cover of the disk shipper illustrated in FIG. 32, taken along line 34—34 of FIG. 32.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. For example, the mechanism by which the independent locking member attaches to the cassette can vary to include other locking mechanisms positioned at other points along the independent locking member of the top cover to vary and/or optimize the mechanical advantage provided by the locking member. This may include a post 140 and aperture 260 arrangement as shown, for example, by the cassette of FIGS. 13, 16 and 17 and the cover of FIGS. 32–34. Other alternatives, within the scope of the present invention, will likely occur to those of ordinary skill in the art upon review of the specification and appended claims.

What is claimed is:

1. A cassette for holding memory disks in axial alignment, the cassette comprising:
   (a) a cassette body with two sidewalls adjoining two end walls, the cassette body having an open top and an open bottom, inwardly facing teeth disposed on the inside surface of each sidewall and defining slots for receiving memory disks, each end wall having a top edge, a bottom edge and an opening extending downwardly from the top edge toward the bottom edge;
   (b) a top cover removably engagable with the cassette to close the open top and open end walls, the top cover having a generally rectangular top portion defining a perimeter of the top cover, a skirt portion depending from at least a portion of the top portion and two opposite end portions integral with the top portion and extending downwardly from the perimeter of said top portion, for closing each of said openings in the end walls;
   (c) a locking member disposed at each end of the top cover and extending downwardly from said top cover to secure the top cover to the cassette body, said locking members separate from said end portions and said skirt portion; and
   (d) a bottom cover for closing the bottom opening.

2. The cassette of claim 1, wherein the end portions comprise a recess portion which extends into and matches the contour of said opening in said end walls when the top cover is in place on the cassette.

3. The cassette of claim 1, wherein said locking members comprise a one piece member with a central opening defining an internal edge which is spaced from and follows the perimeter edge of said end portion.

4. The cassette of claim 1, wherein said locking members are inwardly biased.

5. The cassette of claim 3, wherein said locking members are cantilevered from said top portion of said top cover.

6. The cassette of claim 5, wherein a portion of said locking members are arcuate shaped.

7. The cassette of claim 1, wherein a gap is formed between said locking members and said end portions.

8. The cassette of claim 1, further comprising at least one latching mechanism wherein said at least one latching mechanism comprises a pair of interlocking members, with a first interlocking member disposed on said locking member and a second interlocking member disposed on said end wall.

9. The cassette of claim 8, wherein said interlocking members comprise locking surfaces that abut when the top cover is secured to the cassette.

10. The cassette of claim 9, wherein said interlocking members further comprise camming surfaces which slidably interact as the top cover engages the cassette.

11. The cassette of claim 1, wherein said end wall further comprises a rim disposed around the outer edge of said opening which extends outwardly from said end wall by a distance that gradually increases from the top edge of said end wall to the bottom of said opening.

12. The cassette of claim 1, wherein said end walls are parallel with respect to each other.

13. The cassette of claim 1, wherein said end walls are disposed perpendicular to the bottom cover.

14. The cassette of claim 11, further comprising a flange disposed around the perimeter of said end portion of said top cover wherein said flange abuts said rim when said cover is secured to said cassette, and said rim outwardly biases said flange to assist in sealing the opening in said end wall.

15. The cassette of claim 8, wherein said first interlocking member comprises a hook portion which cooperatively engages the second interlocking member and said second interlocking member is positioned on the end wall of the cassette.

16. The cassette of claim 8, wherein first interlocking member comprises an opening and said second interlocking member comprises a projection for engaging and securing said first interlocking member.

17. The cassette of claim 1, further comprising a guard member disposed outwardly from the top edge of said two side walls.

18. The cassette of claim 17, wherein said guard member defines a slot between itself and the top edge of said side walls.

19. The cassette of claim 18, wherein said generally rectangular top portion further comprises a perimeter flange, a portion of which nests in said slot when said top cover is secured to said cassette.

20. The cassette of claim 17, wherein said guard member extends along the top edge of said two side walls from one end wall to the other end wall.

21. The cassette of claim 20, wherein said guard portion disposed proximate the intersection of said side walls and said end walls is enlarged.

22. A cassette for holding a plurality of memory disks, the cassette comprising:
(a) a cassette body with two sidewalls adjoining two end walls, the cassette body having an open top and an open bottom, slots formed on the inside of each of said side walls for receiving memory disks, a channel formed along the top edge of said side walls, said end walls having a top edge and a bottom edge, an opening in each end wall extending downwardly from the top edge toward the bottom edge providing access to the memory disks;
(b) a bottom cover for closing the open bottom; and
(c) a top cover removably engagable with the cassette body to close the open top and the openings in said end walls, the top cover having a generally rectangular top portion and two opposite end portions, the two opposite end portions shaped to close the opening in the end walls, a skirt extending downwardly from said top portion along the long edges of said top portion, said skirt having an outer surface disposed generally parallel to the sidewall of the cassette and said skirt nesting within said channel of said cassette body sidewalls when said top cover engages said cassette whereby at least a portion of the outer surface of said skirt is enclosed by said channel.

23. The cassette of claim 22, wherein the channel extends along said sidewalls from one end wall to the opposite end wall.

24. The cassette of claim 23, wherein the top edge of said side walls disposed outwardly of said channel and proximate said end walls is enlarged.

25. The cassette of claim 22, further comprising a locking member attached to each end portion of said top cover.

26. The cassette of claim 25, wherein said locking members are separate from said end portions.

27. The cassette of claim 25, wherein said locking members comprise a flexible one-piece U-shaped arm.

28. The cassette of claim 27, wherein said U-shaped arms are disposed outwardly of said end portions.

29. The cassette of claim 25, further comprising a first latching member disposed on said locking member and a second latching member disposed on said end wall outwardly of said opening.

30. The cassette of claim 29, wherein said first and second latching members comprise a camming surface and a latching surface wherein said camming surfaces engage as said cover is moved toward securement with said cassette and said latching surfaces engage to secure said cover to said cassette.

31. The cassette of claim 25, further comprising two latching members disposed on each locking member and two locking members disposed on each end wall.

32. A container for holding disks, the container comprising:
(a) a cassette with two sidewalls adjoining two end walls, the cassette having an open top and an open bottom, slots formed on the inside of each of said side walls for receiving memory disks, said sidewalls having a top edge and a bottom edge, a guard member disposed outside of and proximate the top edge of said sidewalls and defining a channel having the at least three sides, said end walls having a top edge and a bottom edge, an opening in each end wall extending downwardly from the top edge toward the bottom edge providing access to the memory disks;
(b) a bottom cover for closing the open bottom; and
(c) a top cover removably engagable with the cassette to close the open top and the openings in said end walls, the top cover having a generally rectangular top portion and two opposite end portions, said top portion defined by two long edges and two shorter edges, at least a portion of said long edges positioned within said channel when said top cover engages said cassette to preclude direct contact with the portion of said long edges positioned in said channel by an external object.

33. The container of claim 32, wherein said guard members have a first end and a second end positioned adjacent the intersection of end walls and sidewalls, and further comprise thickened portions at said first and second ends to provide impact protection.

34. In a container for storing and transporting memory disks having a cassette with an open top, open bottom and an opening in at least one end wall, a top cover with a top portion to close the open top and an end portion to nest in and close the opening in at least one end wall, and a bottom cover to close the bottom opening, the improvement comprising:
  a locking member cantilevered from the top portion of the top cover, extending approximately at least half way down the at least one end wall, and separate from the end portion.

35. The container of claim 34, further comprising a gap formed between said locking member and said end portion.

36. The container of claim 34, wherein said locking member engages the end portion of the cover to secure the cover to the cassette.

37. The container of claim 34, wherein said locking member engages the cassette to secure the cover to the cassette.

38. A system for storing and/or transporting hard memory disks in axial alignment, comprising:
  (a) a cassette with two sidewalls adjoining two end walls, the cassette having an open top and an open bottom, grooves disposed on the inside surface of each sidewall for receiving memory disks, each end wall having a top edge, a bottom edge and an opening extending downwardly from the top edge toward the bottom edge on each end wall;
  (b) a top cover removably en a able with the cassette to close the open top and open end walls, the top cover having a generally rectangular top portion, a skirt depending from said generally rectangular top portion, and two opposite end portions integral with the top portion, said end portions extending downwardly from said top portion for closing each of said openings in the end walls;
  (c) a first locking member disposed at each end of the top cover, each first locking member depending from the top cover and positioned below said skirt and separate from said end portions, and a second locking member disposed on each end wall adjacent said at least one opening in said end wall, said first and second locking members cooperating with each other to secure the top cover to the cassette; and
  (d) a bottom cover for closing the bottom opening.

39. A cassette for holding memory disks in axial alignment, the cassette comprising:
  (a) a cassette body with two sidewalls adjoining two end walls, the cassette having an open top and an open bottom, inwardly facing teeth disposed on the inside surface of each sidewall and defining slots for receiving memory disks, each end wall having a top edge, a bottom edge and an opening extending downwardly from the top edge toward the bottom edge;
  (b) a top cover removably engagable with the cassette body to close the open top and open end walls, the top cover having a generally rectangular top portion defining a perimeter of the top cover and two opposite end portions integral with the top portion and extending downwardly from the perimeter of said top portion, for closing each of said openings in the end walls;
  (c) a locking member disposed at each end of the top cover and extending downwardly from said top cover to secure the top cover to the cassette body at a position at least equidistant between the top edge and bottom edge of the end wall or closer to the bottom edge of the end wall of the cassette body, said locking members separate from said end portions; and
  (d) a bottom cover for closing the bottom opening.

40. A cassette for holding memory disks in axial alignment, the cassette comprising:
  (a) a cassette body with two sidewalls adjoining two end walls, the cassette having an open top and an open bottom, inwardly facing teeth disposed on the inside surface of each sidewall and defining slots for receiving memory disks, each end wall having a top edge, a bottom edge and an opening extending downwardly from the top edge toward the bottom edge;
  (b) a top cover removably engagable with the cassette body to close the open top and open end walls, the top cover having a generally rectangular top portion defining a perimeter of the top cover and two opposite end portions integral with the top portion and extending downwardly from the perimeter of said top portion for closing each of said openings in the end walls;
  (c) a locking member disposed at each end of the top cover and extending downwardly from said top cover to secure the top cover to the cassette body, said locking member separate from said end portion and having a central opening defining in internal edge which is spaced from the perimeter edge of said end portion; and
  (d) a bottom cover for closing the bottom opening.

41. A container for holding a plurality of memory disks, the container comprising:
  (a) a cassette with two sidewalls adjoining two end walls, the cassette having an open top and an open bottom, slots formed on the inside of each of said side walls for receiving memory disks, a channel formed along the top edge of said side walls, said end walls having a top edge and a bottom edge, an opening in each end wall extending downwardly from the top edge toward the bottom edge providing access to the memory disks;
  (b) a bottom cover for closing the open bottom;
  (c) a top cover removably engagable with the cassette to close the open top and the openings in said end walls, the top cover having a generally rectangular top portion and two opposite end portions, the two opposite end portions shaped to close the opening in the end walls, a skirt extending downwardly from said top portion along the long edges of said top portion, said skirt nesting within said channel of said cassette sidewalls when said top cover engages said cassette; and
  (d) a first latching member disposed on each end portion of said top cover and a second latching member disposed on said end wall outwardly of said opening, wherein said first and second latching members comprise a camming surface and a latching surface wherein said camming surfaces engage as said cover is moved toward securement with said cassette and said latching surfaces engage to secure said cover to said cassette.

* * * * *